United States Patent [19]

Kondo

[11] Patent Number: 5,225,954
[45] Date of Patent: Jul. 6, 1993

[54] TAPE CASSETTE THAT CAN BE PLAYED WITH THE LID CLOSED

[75] Inventor: Yoshio Kondo, Tokyo, Japan

[73] Assignee: Sony Corporation, Tokyo, Japan

[21] Appl. No.: 675,158

[22] Filed: Mar. 26, 1991

[30] Foreign Application Priority Data

Mar. 30, 1990 [JP] Japan ................................. 2-84306

[51] Int. Cl.⁵ .............................................. G11B 23/02
[52] U.S. Cl. ..................................... 360/132; 360/84; 360/85; 360/94; 242/199
[58] Field of Search ................... 360/132, 84, 85, 95, 360/130.22, 94; 242/198–199

[56] References Cited

U.S. PATENT DOCUMENTS

| | | | |
|---|---|---|---|
| 3,610,552 | 10/1971 | Shirakura | 360/94 |
| 4,703,384 | 10/1987 | Kawada et al. | 360/94 |
| 4,807,077 | 2/1989 | Zaitsu et al. | 360/95 |
| 4,899,236 | 2/1990 | Edakuba et al. | 360/95 |
| 4,984,109 | 1/1991 | Yakoo | 360/94 |

FOREIGN PATENT DOCUMENTS

| | | | |
|---|---|---|---|
| 0077876 | 5/1983 | European Pat. Off. | 360/94 |
| 3234854 | 5/1983 | Fed. Rep. of Germany | 360/94 |
| 60-205885 | 10/1985 | Japan | 360/94 |
| 2148481 | 6/1990 | Japan | 360/94 |

Primary Examiner—A. J. Heinz
Assistant Examiner—Alfonso Garcia
Attorney, Agent, or Firm—Lewis H. Eslinger; Jay H. Maioli

[57] ABSTRACT

A tape cassette comprises a housing and a pair of reels mounted for rotation in the housing. A recording tape is wound on the reels and extends therebetween for transport from one of the reels to the other. The housing is formed with an opening through which a transducer can gain access to the recording tape for recording or reproducing signals on or from the recording tape. Front and back lids are connected to the housing and movable between a closed position wherein the front and back lids block the opening and form a channel capable of enclosing the recording medium at a front portion of the housing and an open position wherein the front and back lids are displaced from the opening and from the recording medium. The back lid is formed to leave a pair of gaps near either end thereof capable of accommodating passage of the recording medium therethrough when the front and back lids are in the closed position. When the front and back lids are in the open position, a transducer can be introduced into or withdrawn from the housing. When the transducer is introduced into the housing, the tape is wrapped around the transducer and the front and back lids can be closed, with the tape passing unhindered through the gaps at the ends of the back lid.

4 Claims, 11 Drawing Sheets

TAPE CASSETTE THAT CAN BE PLAYED WITH THE LID CLOSED

BACKGROUND OF THE INVENTION

1. Field of the Invention

The present invention relates to a tape cassette for use in a magnetic recording and reproducing device such as a videotape recorder and more particularly to a tape cassette having a mouth capable of accommodating a head drum therein and a front lid that can be opened to admit the head drum and then closed, the head drum then being contained within the mouth and a magnetic tape being wound around the head drum. A magnetic recording and reproducing device that employs the tape cassette may have a low profile, since the lid in its closed state does not protrude in the height or thickness dimension of the tape cassette.

2. Description of the Prior Art

There have been proposed tape cassettes for use in magnetic recording and reproducing devices including video tape recorders (VTRs) and the like, the tape cassettes being designed particularly for recording information during a relatively short period of time. The proposed tape cassettes have a cassette housing that accommodates a magnetic tape wound in coils of small diameter, thereby enlarging a mouth in which a head drum can be inserted, so that the magnetic recording and reproducing device may be reduced in size. Reference should be made to Japanese laid-open patent publication No. 60(1985)-171684 and Japanese utility model application No. 62(1987)-14573 filed by the assignee of the present application.

One such tape cassette will briefly be described with reference to FIGS. 9, 10, 11A and 11B. The tape cassette has a cassette housing 51 comprising an upper portion 52 and a lower portion 53 joined together. The upper and lower housing portions 52, 53 accommodate therein a pair of rotatable tape reels 54, 55 with a magnetic tape T wound therearound. The magnetic tape T has a portion unreeled from the tape reels 54, 55 and guided by guides 56a, 56b disposed in spaced positions at the front of the lower housing portion 53, the unreeled tape portion being kept taut and exposed in a front opening in the cassette housing 51. The cassette housing 51 has a mouth (opening) 57 formed in a lower panel of the lower housing portion 53 between and somewhat forwardly of a position between the tape reels 54, 55.

The diameter of the tape reels 54, 55 is smaller than the reel diameter of a conventional, standard tape cassette, and therefore the mouth 57 is correspondingly larger.

A front lid 58 is mounted for angular movement in a vertical plane at the front of the cassette housing 51 by laterally spaced shafts 59 to selectively open and close the front opening of the cassette housing 51. When the front opening of the cassette housing 51 is closed by the front lid 58, the front lid 58 protects the face of the magnetic tape T, which extends under tension between the guides 56a, 56b. When the tape cassette is not in use, the front lid 58 is closed to cover the face of the magnetic tape T. When the tape cassette is in use, the lid 58 is turned upwardly to expose the magnetic tape T at the front of the cassette housing 51.

A back lid 60 for protecting the back of the magnetic tape T is disposed behind the front lid 58. The back lid 60 has shafts 61 on respective opposite side edges thereof, the shafts 61 being pivotally supported by respective supports 62 which project from the rear surface of the front lid 58. The back lid 60 is thus angularly movably coupled to the front lid 58. The back lid 60 also has engaging pins 63 projecting from respective opposite ends thereof. The engaging pins 63 are movably received in respective cam grooves 65 defined in the inner surfaces of vertical walls 64, respectively, which are located in laterally spaced positions at the front of the lower housing portion 53. When the front lid 58 is opened or closed with respect to the cassette housing 51, the engaging pins 63 are guided by and along the cam grooves 65 to cause the back lid 60 to be opened or closed in coordination with the front lid 58.

When the tape cassette is in use, the front lid 58 is opened, and a head drum 71 and various tape transport members 72 including an impedance roller 73, tape guides 74, 75, 76, loading posts 77, 78, a capstan 79, and a pinch roller 80 are inserted into the mouth 57. The magnetic tape T is now wound or loaded around the head drum 71 for recording and reproducing signals on the magnetic tape T.

Since the tape reels 54, 55 are smaller in diameter and the mouth 57 is correspondingly larger, the head drum 71 and the tape transport members 72 can be inserted deeply into the cassette housing 51. As a result, the magnetic recording and reproducing device can be reduced in size.

Although employment of a magnetic tape cassette of the type described above makes it possible to insert the head drum and other members deeply into the mouth, signals are conventionally recorded on and reproduced from the magnetic tape while the lids are open. In the open position, the lids protrude well beyond the contour that the cassette housing has when the lids are in the closed position. Recording or reproducing signals on or from the magnetic tape when the lids are in the open position therefore imposes a severe limitation on efforts to make the magnetic recording and reproducing devices more compact.

More specifically, when the lids are open, the entire thickness of the tape cassette is increased by a dimension h (FIG. 11B), which corresponds to the raised portion of the lids. The increase in the thickness of the tape cassette presents an obstacle to attempts to make the magnetic recording and reproducing device lower in profile. One solution would be to close the lids after the tape has been loaded around the head drum, thereby eliminating any increase in the thickness of the tape cassette. However, if the lids were to be closed after the tape has been loaded, the back lid moving in coaction with the front lid would physically interfere with the magnetic tape drawn into the mouth. Therefore, it is impossible to close the lids of a conventional tape cassette after the magnetic tape has been loaded.

OBJECTS AND SUMMARY OF THE INVENTION

In view of the aforesaid difficulties with conventional tape cassettes, it is an object of the present invention to provide a tape cassette whose lids can be closed after a magnetic tape has been loaded around a head drum, so that a magnetic recording and reproducing device that employs a tape cassette can have a low profile.

The foregoing and other objects are attained in accordance with the invention by the provision of a tape cassette comprising: housing means; a pair of reels;

means mounting the reels for rotation in the housing means; a recording medium wound on the reels and extending therebetween for transport from one of the reels to the other; the housing means being formed with an opening through which transducer means can gain access to the recording medium for recording or reproducing signals on or from the recording medium; and lid means connected to the housing means and movable between a first position wherein the lid means blocks the opening and a second position wherein the lid means is displaced from the opening and from the recording medium; wherein the lid means is in the first position and the recording medium is enclosed within the housing means for protection when the tape cassette is not in use; the lid means is in the second position during introduction of transducer means into or withdrawal of transducer means from the housing means; and at least one gap-defining means is provided for accommodating passage of the recording medium so that the transducer means is enclosed within the housing means, the lid means is in the first position, and the recording medium is in operative association with the transducer means during recording or reproducing of signals on or from the recording medium.

In accordance with a preferred aspect of the invention, the lid means comprises front and back lid means connected to the housing means, the front and back lid means in the first position forming a channel capable of enclosing the recording medium. The back lid means is formed to leave at least one gap and preferably two gaps, one at either end thereof, capable of accommodating passage of the recording medium therethrough when the front and back lid means are in the first position.

Thus, while in its broadest aspect the invention is a tape cassette that can be played in the closed position, preferably the invention is implemented by a tape cassette having a mouth for inserting a head drum for recording or reproducing signals on and from a magnetic tape, a front lid angularly movably mounted for covering the face of the magnetic tape which is exposed on a front side of a cassette housing, and a back lid for covering the back of the magnetic tape, the back lid being openable and closable in coaction with the front lid, and the back lid having at least one gap for passage of the magnetic tape therethrough to allow the front lid to be closed when the magnetic tape is drawn into the mouth by the head drum.

Since the back lid has a gap for passing the magnetic tape therethrough, the back lid can be closed smoothly without physical interference with the magnetic tape. Inasmuch as the lids can be closed during recording or reproduction, the thickness of the tape cassette and hence the magnetic recording and reproducing device can be reduced. Accordingly, the magnetic recording and reproducing device is rendered more compact.

A better understanding of the invention can be gained from a consideration of the following detailed description of the preferred embodiments of the invention, in conjunction with the appended figures of the drawing, wherein a given reference character always refers to the same element or part.

DESCRIPTION OF THE PREFERRED EMBODIMENTS

Figure 1:
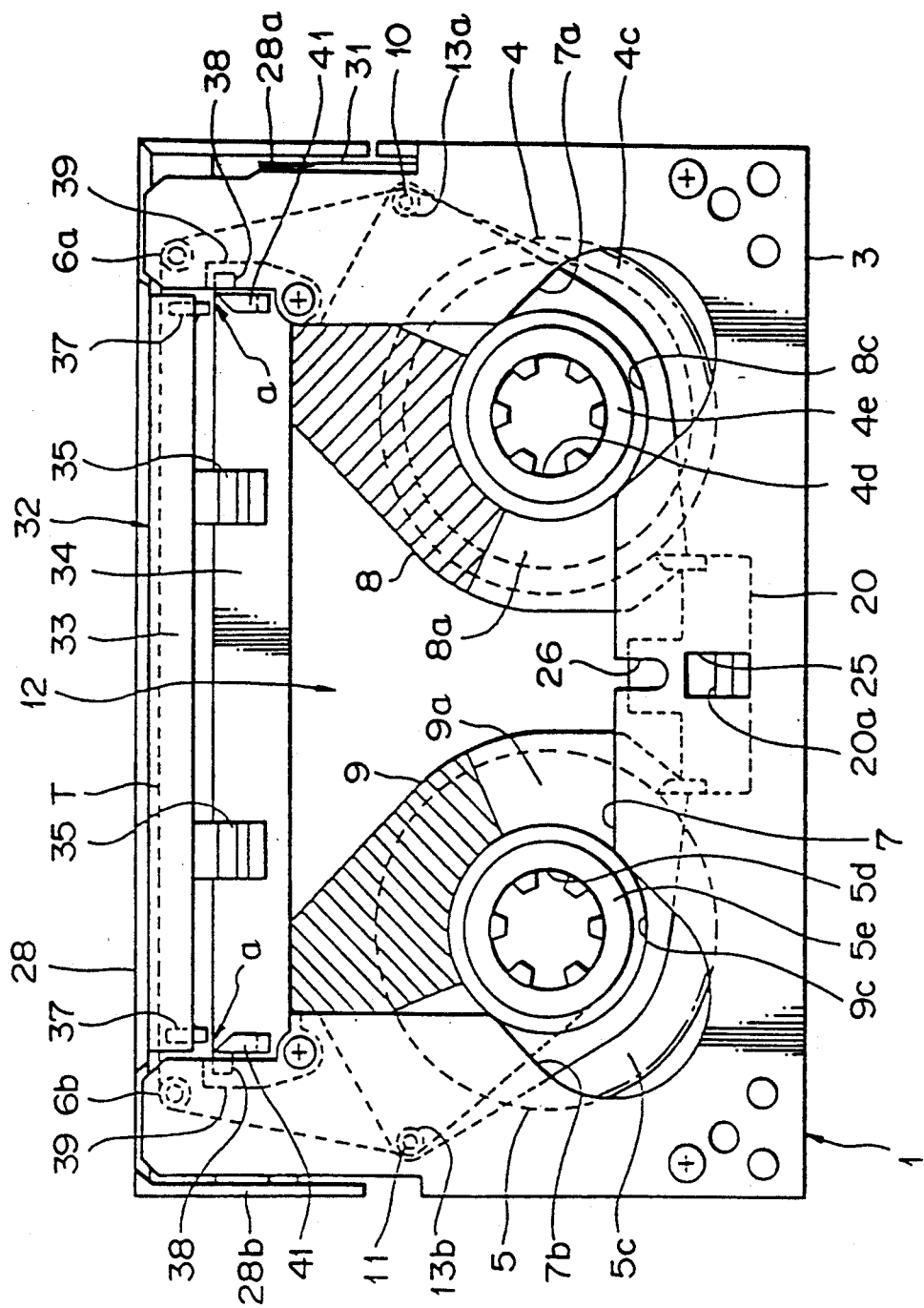
FIG. 1 is a bottom plan view of a tape cassette according to the present invention.
Figure 2:
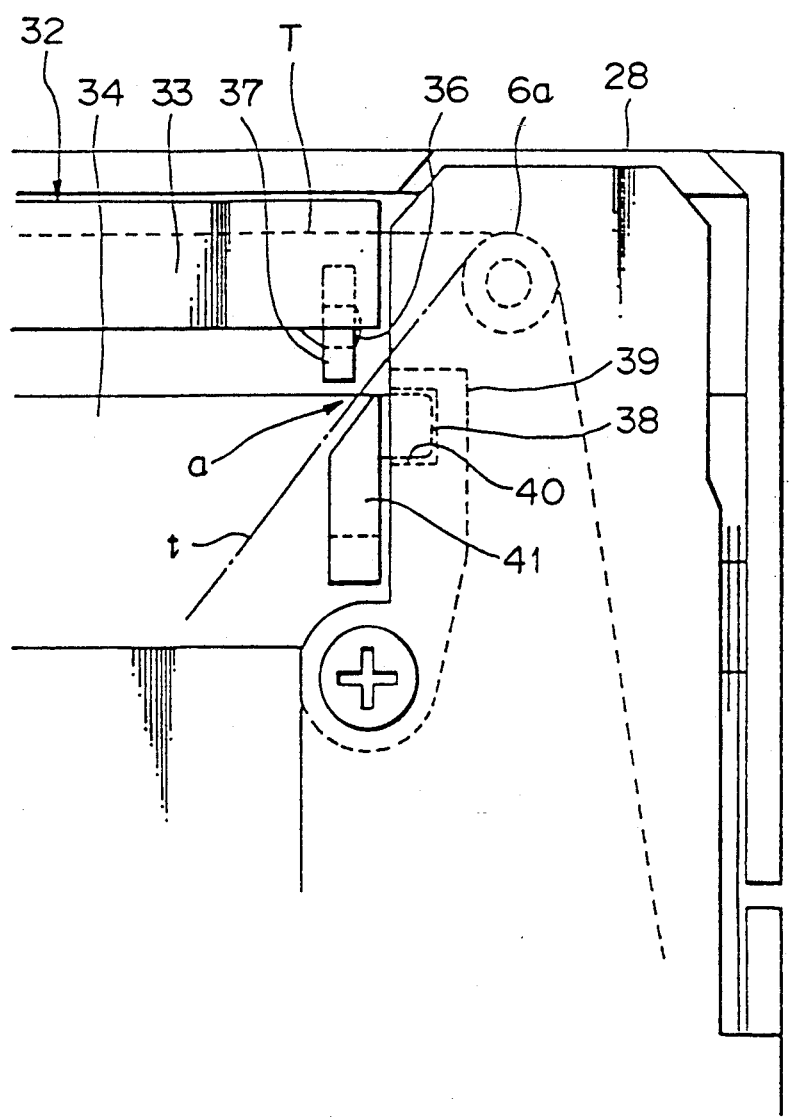
FIG. 2 is an enlarged fragmentary view of a portion of the tape cassette of FIG. 1.
Figure 3:
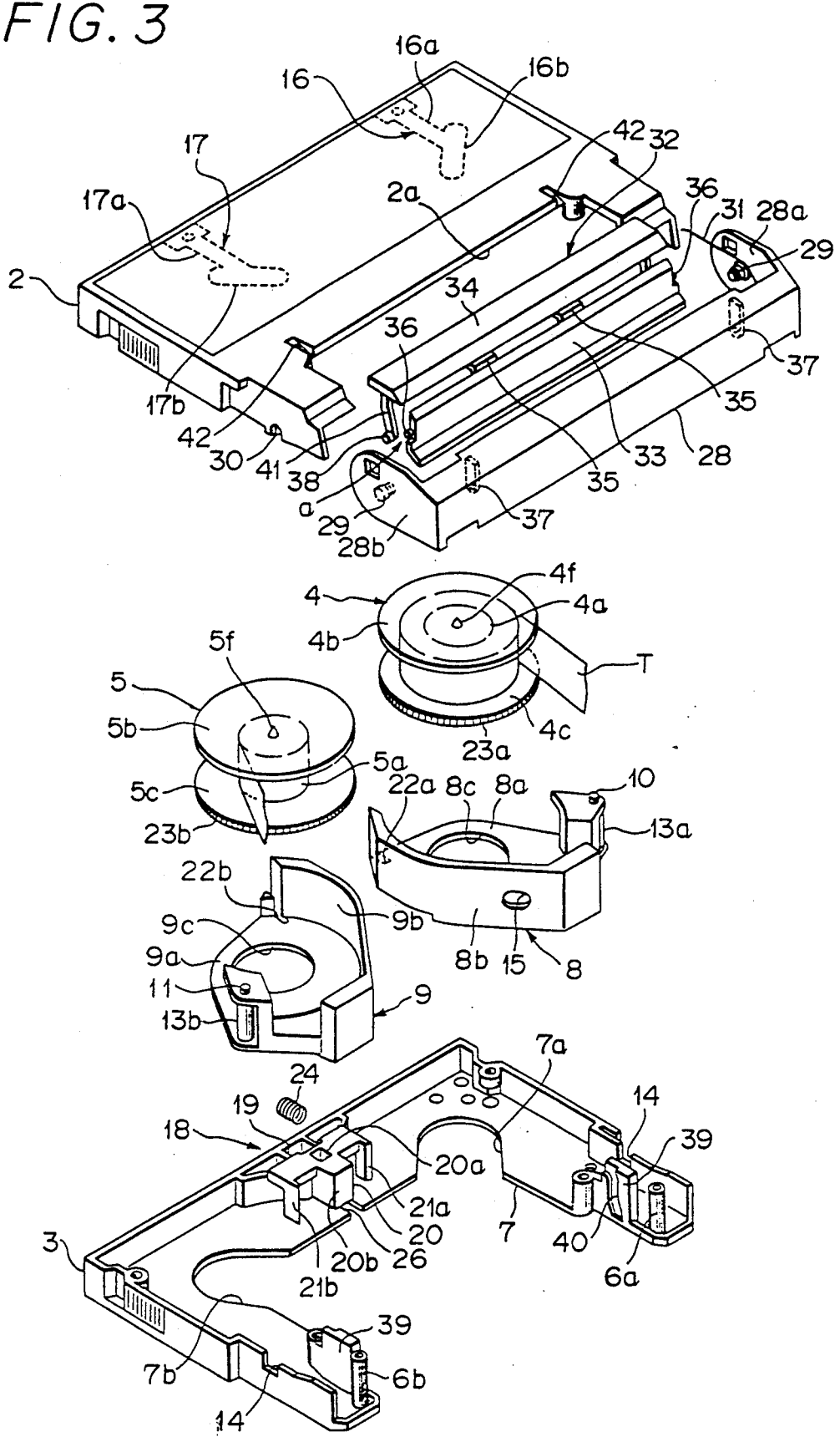
FIG. 3 is an exploded perspective view from the upper left front of the tape cassette.
Figure 4:
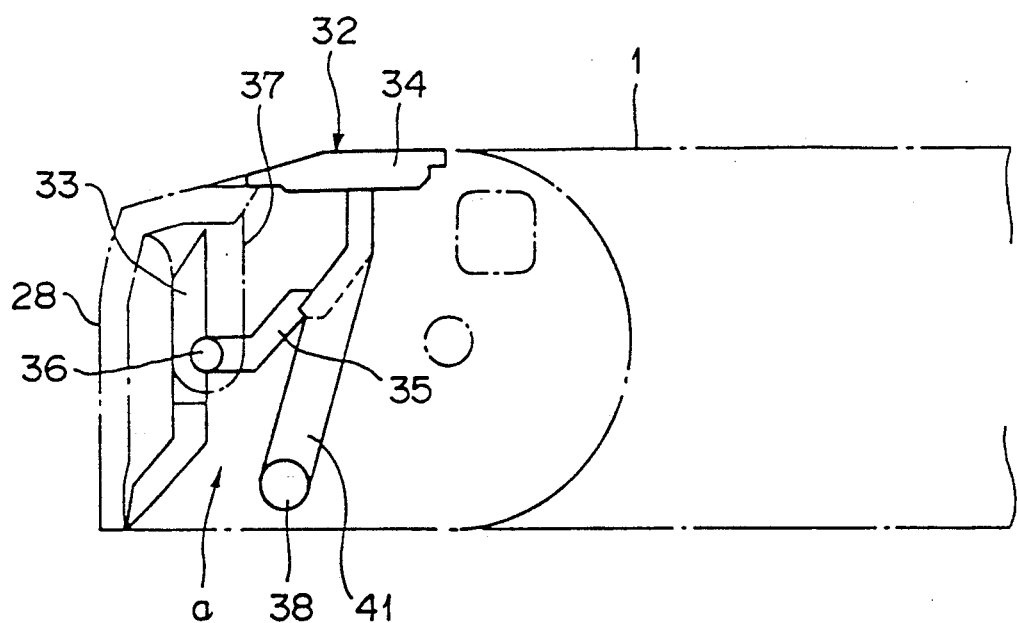
FIG. 4 is an enlarged side elevational view illustrative of a back lid of the tape cassette.

An embodiment of the present invention is described below in detail with reference to FIGS. 1-8.

A tape cassette according to the present invention has a cassette housing 1 comprising an upper portion 2 and a lower portion 3 (see especially FIG. 3) that are joined together by screws or the like.

The cassette housing 1 has an outer configuration and dimensions according to the internationally agreed-upon 8-mm video standards.

The upper and lower housing portions 2, 3 of the cassette housing 1 accommodate therein a pair of rotatable tape reels 4, 5 with a magnetic tape T wound therearound. The magnetic tape T has a portion unreeled from the tape reels 4, 5 and guided by roller guides 6a, 6b disposed in spaced positions at the front end of the lower housing portion 3. The unreeled tape portion is kept taut and is stretched across a front opening in the cassette housing 5.

The tape reels 4, 5 have respective hubs 4a, 5a around which the magnetic tape T is wound, and respective pairs of upper and lower flanges 4b, 4c and 5b, 5c for holding upper and lower surfaces of the tape coils around the hubs 4a, 5a. The tape reels 4, 5 have central reel shaft insertion holes 4d, 5d (FIG. 1), respectively, defined therein and opening downwardly. The upper and lower flanges 4b, 4c and 5b, 5c of the tape reels 4, 5 have a diameter smaller than that of the tape reel flanges of a conventional, standard tape cassette. Therefore, the magnetic tape T wound around the tape reels 4, 5 is shorter than the magnetic tape in a standard tape cassette. For example, the magnetic tape T can record or reproduce information during a period of time ranging from 30 to 60 minutes.

The tape reels 4, 5 are movable in the cassette housing 1 between a normal position which is determined by the 8-mm video standards and a retracted position near the rear corners of the cassette housing 1.

A mechanism for moving the tape reels 4, 5 between the normal and retracted positions in the tape cassette 1 is constructed as follows:

The lower panel of the lower housing portion 3 has a large recess 7 formed behind the portion of the magnetic tape T that extends under tension between the roller guides 6a, 6b. A pair of reel holders 8, 9 is disposed above the recess 7 in the cassette housing 1. The reel holders 8, 9 are supported on laterally spaced opposite sides of the cassette housing 1 by respective support shafts 10, 11 so that they can be pivoted in a direction having a component in the transverse (i.e., front-to-back) direction of the cassette housing 1 and also having a component in the left-to-right direction of the cassette housing 1. The tape reels 4, 5 are rotatably supported respectively on the reel holders 8, 9. The reel holders 8, 9 comprise respective support plates 8a, 9a on which the respective tape reels 4, 5 are placed, and respective shield walls 8b, 9b disposed in covering relation with respect to front and inner sides of the tape reels 4, 5, respectively. The support plates 8a, 9a have respective holes 8c, 9c formed therein. The tape reels 4, 5 have respective annular ridges 4e, 5e (FIG. 1) projecting downwardly from the bottoms thereof and extending around the edges of the reel shaft insertion holes 4d, 5d. The annular ridges 4e, 5e are loosely fitted respectively in the holes 8c, 9c.

A mouth 12 for inserting a head drum and tape loading members therein for recording signals on and reproducing signals from the magnetic tape T is formed between and somewhat in front of the shield walls 8b, 9b of the reel holders 8, 9. When the reel holders 8, 9 are angularly moved, the tape reels 4, 5 are also moved, thereby varying the size of the mouth 12.

The lower panel of the lower housing portion 3 also has a pair of recesses 7a, 7b formed therein in alignment with the holes 8c, 9c of the reel holders 8, 9 and contiguous with the recess 7. The recesses 7a, 7b extend along paths of the swingable reel holders 8, 9.

The support plates 8a, 8b of the reel holders 8, 9 have surface areas (shown hatched in FIG. 1) exposed in the recess 7 and positioned so as to avoid physical interference with the lower housing portion 3 when the reel holders 8, 9 are pivoted. These surface areas are raised so as to be flush with the lower surface of the lower panel of the lower housing portion 3. The raised surface areas serve as a positioning reference surface for positioning the tape cassette when the tape cassette is loaded into a magnetic recording and reproducing device.

Roller guides 13a, 13b are rotatably fitted respectively over the support shafts 10, 11. The magnetic tape T wound around the tape reels 4, 5 is guided over the roller guides 13a, 13b toward the roller guides 6a, 6b at the front of the cassette housing 1, and extends between the roller guides 6a, 6b along the front opening of the cassette housing 1.

The opposite side walls of the lower housing portion 3 and the shield walls 8b, 9b of the reel holders 8, 9 have through-holes 14, 15 (FIGS. 3 and 5-7) for passing therethrough beams of light for detecting the starting and finishing ends of the magnetic tape T.

Reel presser springs 16, 17 in the form of leaf springs are mounted on the lower surface of the upper panel of the upper housing portion 2. The reel presser springs 16, 17 comprise respective arms 16a, 17a whose proximal ends are fixed to the upper housing portion 2, and respective pressers 16b, 17b contiguous with distal ends of the arms 16a, 17a, respectively. The pressers 16b, 17b press respective central projections 4f, 5f of the tape reels 4, 5. The pressers 16b, 17b are of a arcuate shape extending along the paths of travel of the tape reels 4, 5 as they are moved by the respective reel holders 8, 9.

The cassette housing 1 also houses in its rear portion a lock mechanism 18 for locking the tape reels 4, 5 and the reel holders 8, 9 against rotation. The lock mechanism 18 is constructed as follows:

The lock mechanism 18 includes a lock member 20 positioned centrally at the rear of the cassette housing 1. The lock member 20 is movable back and forth in a transverse (i.e., front-to-back) direction of the cassette housing 1, along a guide 19 disposed on the lower housing portion 3. The lock member 20 has a pair of fingers 21a, 21b projecting forwardly from laterally spaced opposite ends thereof.

* The reel holders 8, 9 have respective slots 22a, 22b formed in rear ends thereof for receiving the respective fingers 21a, 21b of the lock member 20. The lower flanges 4c, 5c of the tape reels 4, 5 have engaging teeth 23a, 23b formed all around their outer circumferential edges, the engaging teeth 23a, 23b being engageable by the fingers 21a, 21b.

A coil spring 24 is disposed under compression between the lock member 20 and the rear side wall of the lower housing portion 1, for normally urging the lock member 20, including the fingers 21a, 21b, in a forward direction to engage in the slots 22a, 22b of the reel holders 8, 9 and also engage the engaging teeth 23a, 23b of the tape reels 4, 5.

The lock member 20 has a central hole 20a defined therein, and the lower panel of the lower housing portion 3 has an insertion hole 25 (FIG. 1) formed therein in register with the hole 20a. When the tape cassette is loaded in a magnetic recording and reproducing device, as described later on, an unlocking member is inserted from the magnetic recording and reproducing device through the insertion hole 25 into the hole 20a of the lock member 20 to displace the lock member 20 out of locking engagement with the tape reels 4, 5.

The lower panel of the lower housing portion 3 has a groove 26 defined therein in front of the insertion hole 25 and extending rearwardly from the rear edge of the recess 7. When the tape cassette is loaded in the magnetic recording and reproducing device, an unlocking member is inserted from the magnetic recording and reproducing device through the groove 26 into the cassette housing 1 to push the front end 20b of the lock member 20 out of locking engagement with the reel holders 8, 9.

A front lid 28 is mounted for angular movement in a vertical plane at the front of the cassette housing 1 for selectively opening and closing the front opening of the cassette housing 1. When the front opening of the cassette housing 1 is closed by the front lid 28, the front lid 28 protects the front face of the magnetic tape T which extends under tension between the roller guides 6a, 6b.

The front lid 28 has laterally spaced side walls 28a, 28b extending perpendicularly from the opposite ends of the front lid 28. The side walls 28a, 28b have respective shafts 29 projecting toward each other from inner surfaces thereof and received in respective holes 30. The holes 30 are formed in the front ends of opposite side walls of the upper housing portion 2 in cooperation with the front ends of opposite side walls of the lower housing portion 3. The front lid 28 is angularly movable in a vertical plane about the shafts 29 with respect to the cassette housing 1. The front lid 28 is normally urged to turn in a closing direction to cover the face of the magnetic tape T by a torsion spring 31 coiled around one of the shafts 29. Upon loading the tape cassette in the magnetic recording and reproducing device, the front lid 28 is turned upwardly by a lid opening mechanism in the magnetic recording and reproducing device, thereby exposing the magnetic tape T between the roller guides 6a, 6b.

A back lid 32 for protecting the back of the magnetic tape T between the roller guides 6a, 6b is disposed behind the front lid 28.

The back lid 32 comprises a back lid member 33 for covering the back of the magnetic tape T and an upper plate 34 for closing a cavity 2a (FIG. 3) formed in the upper panel of the upper housing portion 2. The cavity 2a receives the back lid member 33 when the back lid 32 is opened. The back lid member 33 and the upper plate 34 are joined to each other by links 35.

The back lid member 33 has shafts 36 on respective opposite side edges thereof, the shafts 36 being pivotally supported by respective supports 37 which project from the rear surface of the front lid 28. The back lid 32 is thus coupled to the front lid 28 in such a manner that the back lid 32 and front lid 28 can be moved angularly with respect to each other. The back lid 32 also has engaging pins 38 projecting from respective opposite ends thereof. The engaging pins 38 are movably received in respective cam grooves 40 defined in the inner surfaces of vertical guide walls 39, respectively, which are located in laterally spaced positions at the front of the lower housing portion 3. When the front lid 28 is opened or closed with respect to the cassette housing 1, the engaging pins 38 are guided by and along the cam grooves 40 to cause the back lid 32 to be opened or closed in coordination with the front lid 28.

The tape cassette is constructed to allow the front lid 28 to be closed after a head drum and tape transport members are inserted into the mouth 12, drawing the magnetic tape T into the mouth 12 so that the magnetic tape T will be loaded around the head drum.

More specifically, the back lid 32 has a pair of gaps a defined in the respective opposite sides thereof, for passage therethrough of the magnetic tape T which is drawn into the mouth 12. Two arms 41 project downwardly from the opposite ends of the upper plate 34 of the back lid 32, and have the respective engaging pins 38 projecting outwardly from respective lower ends thereof. Gaps a are formed between the arms 41 and the opposite ends of the back lid member 33, as shown in FIGS. 1-4 and especially in FIGS. 2 and 4. The portion t of the magnetic tape T which is drawn into the mouth 12 passes through the gaps a, as indicated by the dot-and-dash line in FIG. 2. Accordingly, the back lid 32, which moves in coaction with the front lid 28, does not physically interfere with the magnetic tape T. The front lid 28 can thus be closed while the magnetic tape T is loaded for recording or reproducing.

The guide walls 39 of the lower housing portion 3 have respective front edges spaced well away from the roller guides 6a, 6b, thus providing gaps between themselves and the front lid 28 when it is closed, so that the magnetic tape T draw into the mouth 12 is held out of contact with the guide walls 39.

The upper panel of the upper housing portion 2 has a pair of laterally spaced relief grooves 42 communicating with the cavity 2a, for receiving the respective arms 41 of the back lid 32 when the front lid 28 is opened.

Figure 5:
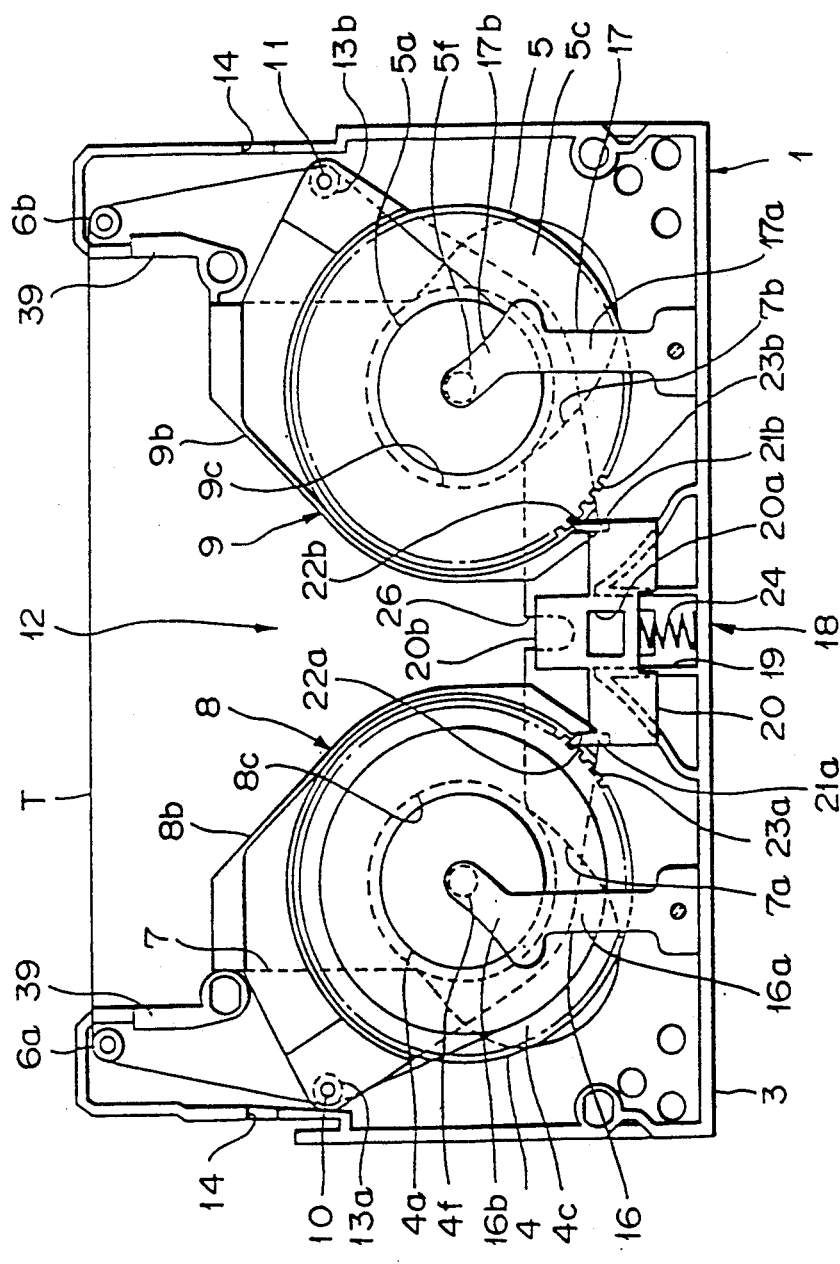
FIG. 5 is a top plan view of the tape cassette, an upper housing portion being omitted from illustration for the sake of clarity, the reels being in standard positions and locked against rotation.

The tape cassette thus constructed operates as follows:

Normally, the tape reels 4, 5 are held in respective standard positions prescribed according to the 8-mm video standards, as shown in FIG. 5. The fingers 21a, 21b of the lock member 20 engage respectively in the slots or grooves 22a, 22b of the reel holders 8, 9 and also engage the respective teeth 23a, 23b of the tape reels 4, 5. The reel holders 8, 9 are locked against pivoting, the tape reels 4, 5 being in the respective standard positions, and the tape reels 4, 5 are locked against rotation.

Since the tape reels 4, 5 are normally in the predetermined standard positions according to the 8-mm video standards, the tape cassette can compatibly be used in the same manner as a conventional standard 8-mm video tape cassette without use of any adapter.

Figure 6:
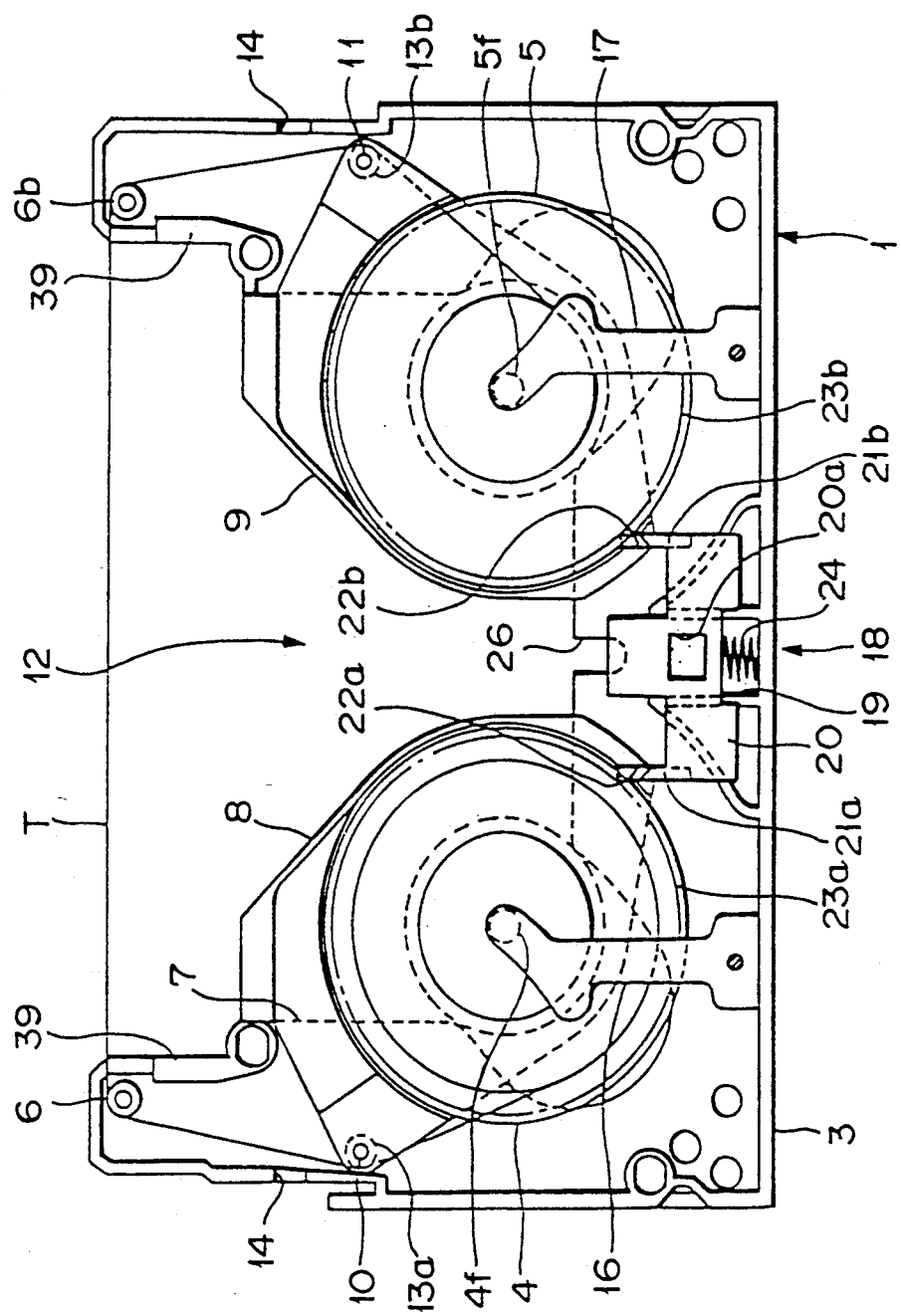
FIG. 6 is a top plan view showing the tape cassette of FIG. 5, the reels being in standard positions but unlocked for rotation.

When the tape cassette is loaded into a standard magnetic recording and reproducing device designed according to the 8-mm video standards, an actuating member (not shown) is inserted from the magnetic recording and reproducing device through the insertion hole 25 (FIG. 1) into the hole 20a (FIG. 3) of the lock member 20, thereby retracting the lock member 20 against the bias of the compression coil spring 24. The retracted movement of the lock member 20 causes the fingers 21a, 21b to be displaced out of locking engagement with the teeth 23a, 23b reels 4, 5, which are now unlocked for rotation, as shown in FIG. 6.

Upon use of the tape cassette in the standard magnetic recording and reproducing device, the fingers 21a, 21b of the lock member 20 are moved out of locking engagement with the teeth 23a, 23b of the tape reels 4, 5, but they remain in locking engagement in the slots or grooves 22a, 22b of the reel holders 8, 9. Therefore, the tape reels 4, 5 are unlocked for rotation but are not movable in translation and remain locked in the prescribed or standard positions with respect to the cassette housing 1. Accordingly, the tape cassette can compatibly be employed in the standard magnetic recording and reproducing device just as though it were a conventional, standard 8-mm video cassette.

Figure 7:
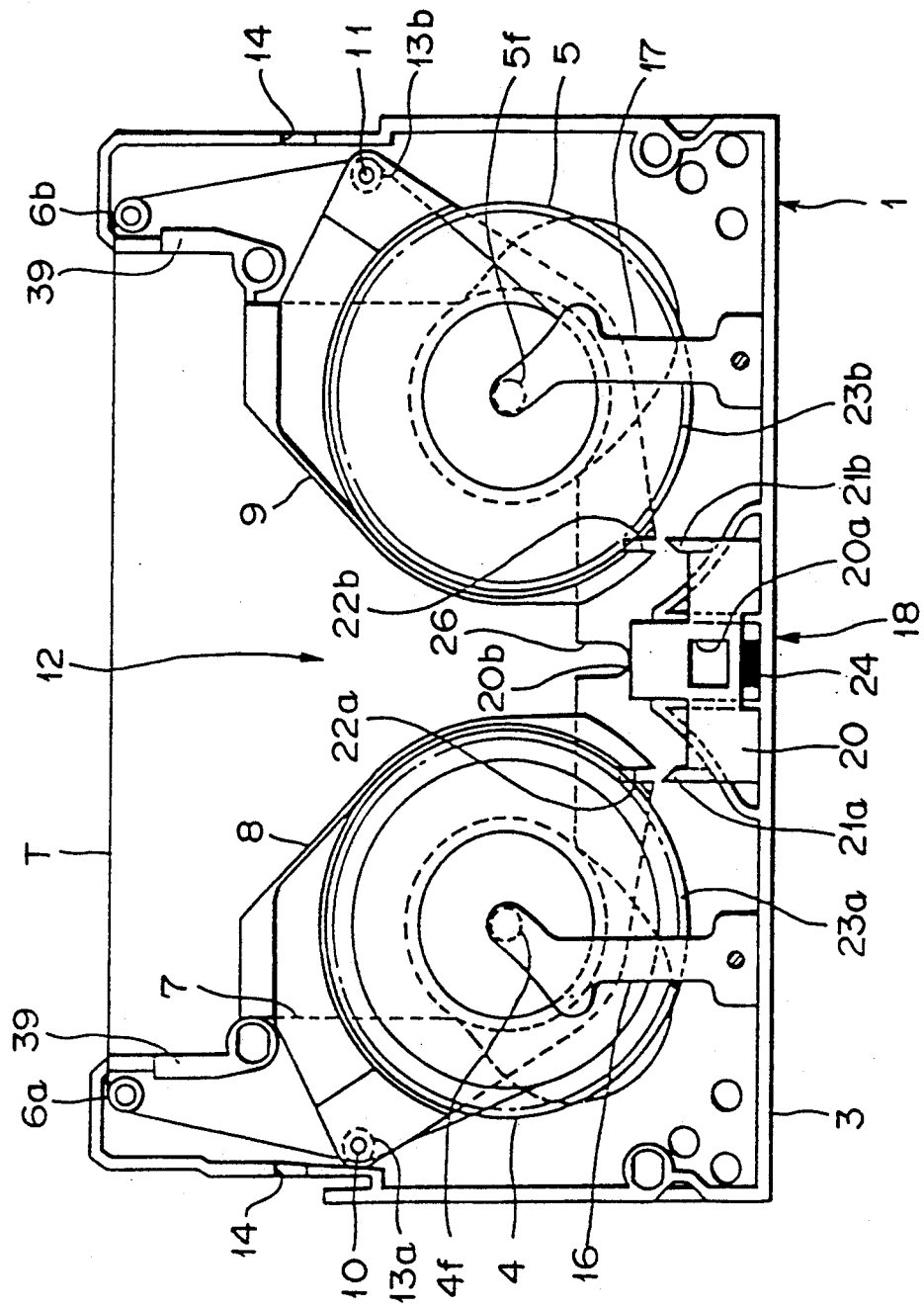
FIG. 7 is a top plan view corresponding to FIG. 6 but showing the reels released so that they can be repositioned.

When the tape cassette is loaded into a magnetic recording and reproducing device dedicated to use a tape cassette constructed in accordance with the present invention, which magnetic recording and reproducing device is different from a magnetic recording and reproducing device conforming to the 8-mm video standards, an actuating member (not shown) is inserted from the magnetic recording and reproducing device through the groove 26 into the cassette housing 1, pressing the front end 20b of the lock member 20. The lock member 20 is now retracted a greater distance than when the tape cassette is loaded into the standard magnetic recording and reproducing device. The fingers 21a, 21b of the lock member 20 are displaced out of locking engagement with the teeth 23a, 23b of the tape reels 4, 5 and also out of locking engagement in the grooves 22a, 22b of the reel holders 8, 9. The tape reels 4, 5 are now rendered rotatable, and the reel holders 8, 9 are also rendered angularly movable, as shown in FIG. 7. The rotatable tape reels 4, 5 can then be translated to retracted positions near the rear corners of the cassette housing 1.

Figure 8:
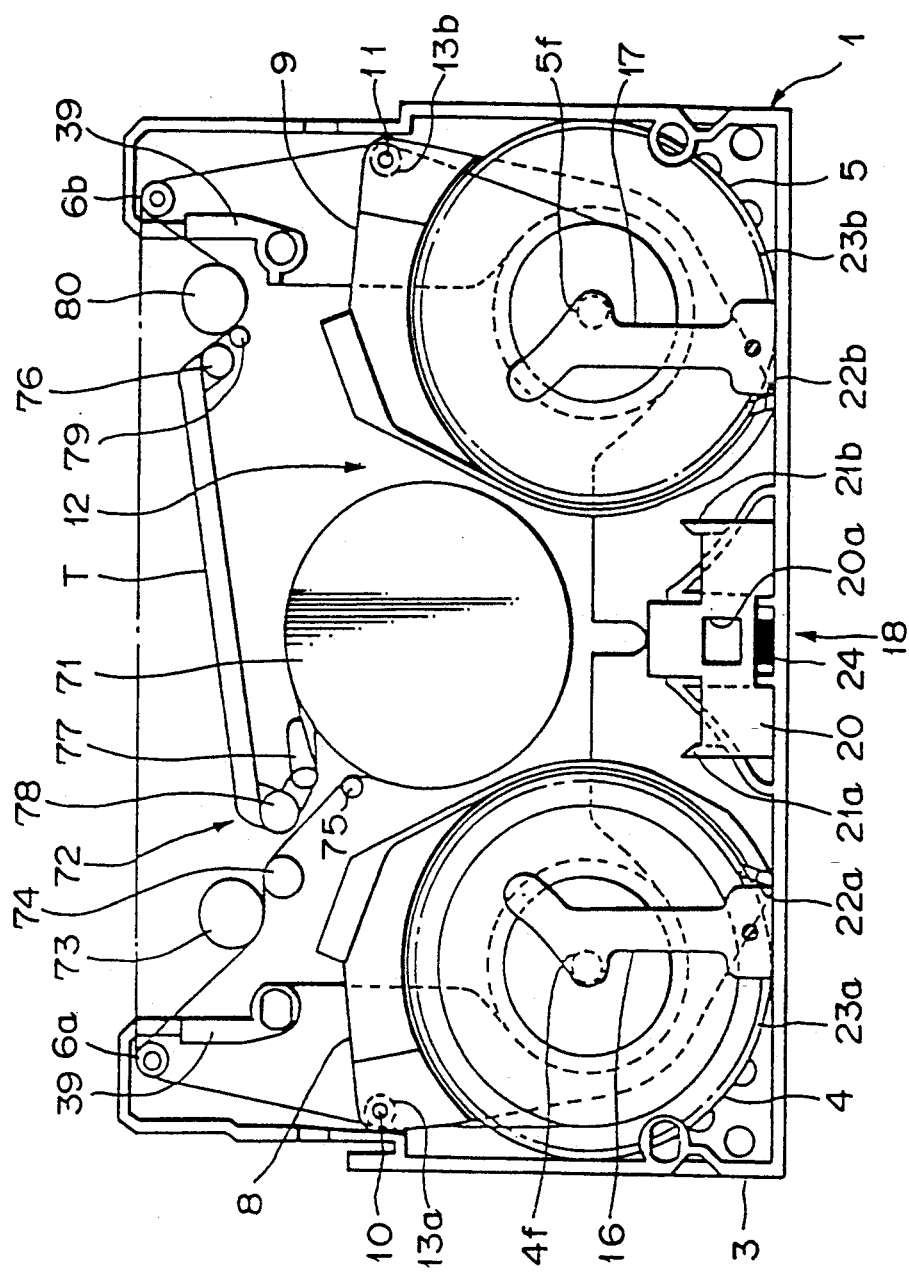
FIG. 8 is a top plan view corresponding to FIG. 7 but showing the reels repositioned near the rear corners of the tape cassette.
Figure 9:
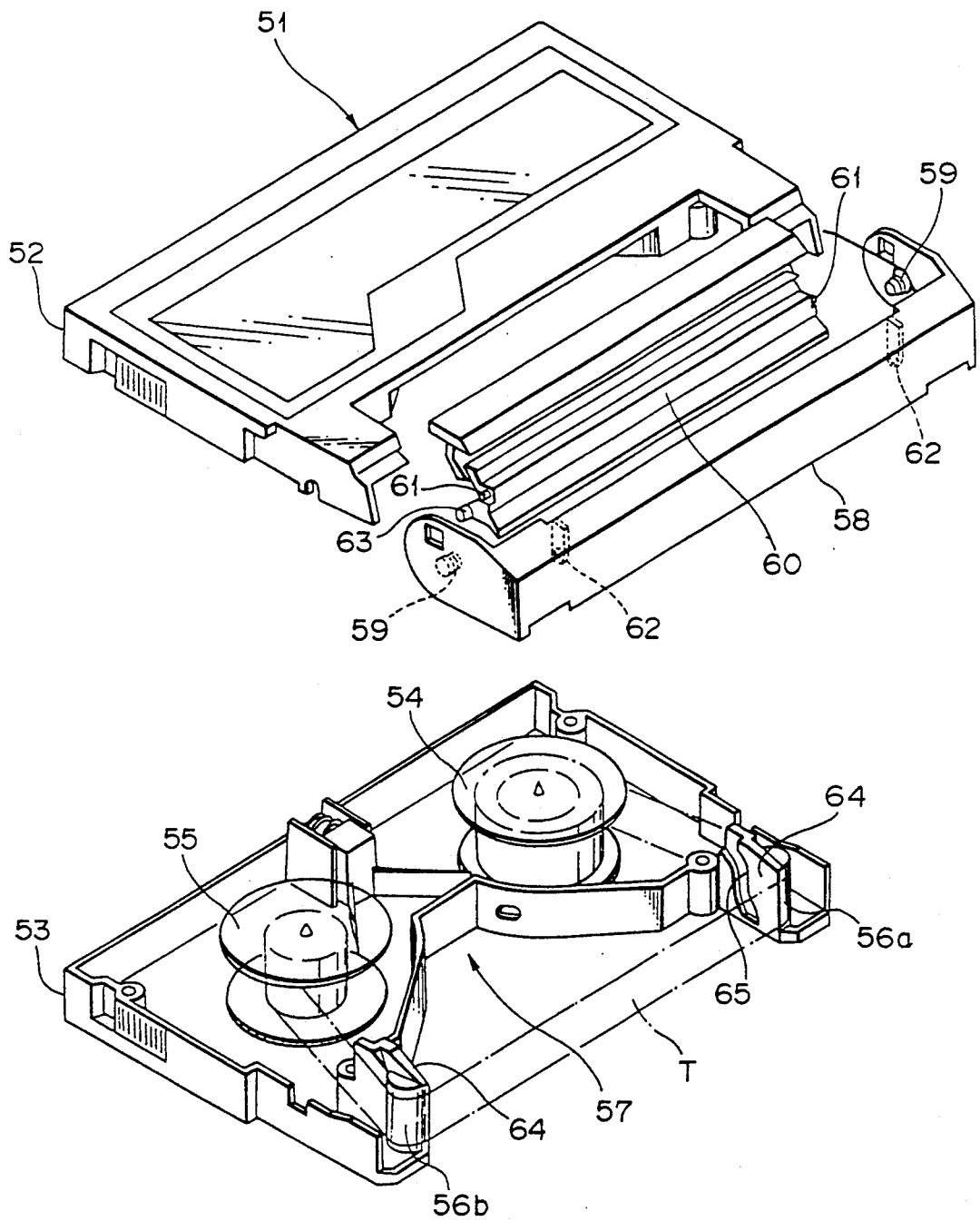
FIG. 9 is an exploded perspective view from the upper left front of a conventional tape cassette.
Figure 10:
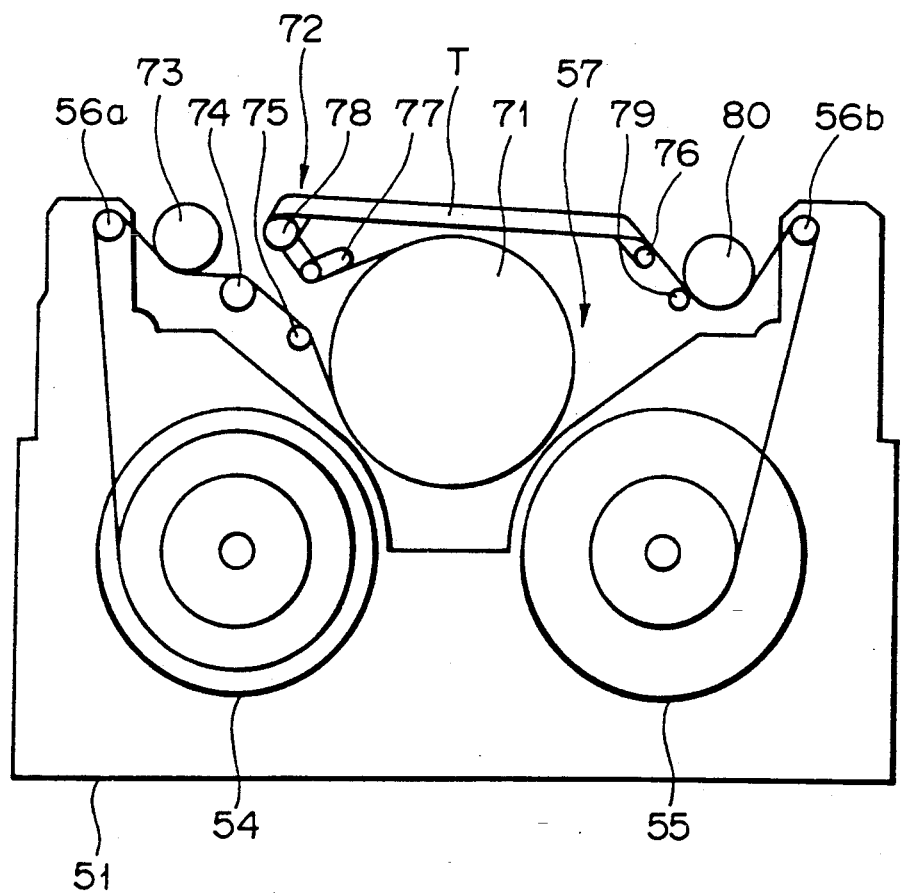
FIG. 10 is a top plan view of the conventional tape cassette of FIG. 9 with a tape loaded around a head drum.
Figure 11A:
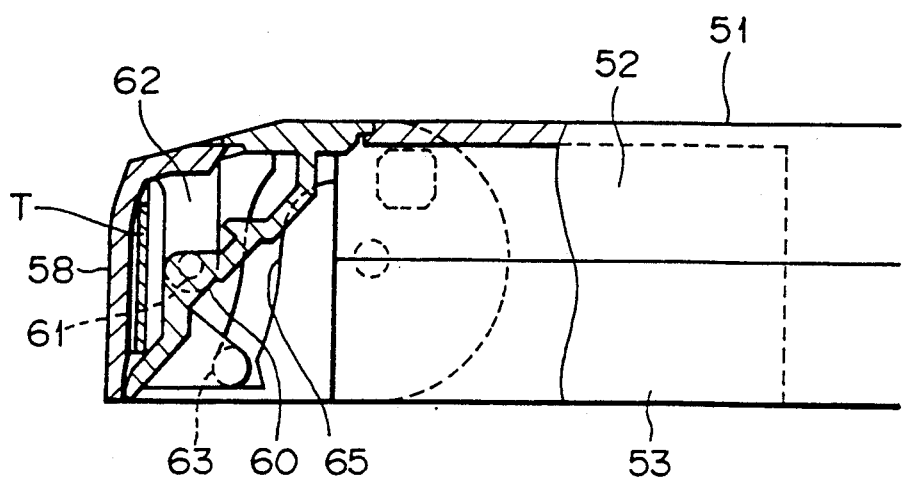
FIGS. 11A and 11B are fragmentary cross-sectional views from the right side of the conventional tape cassette of FIG. 9 showing the manner in which lids are opened and closed.
Figure 11B:
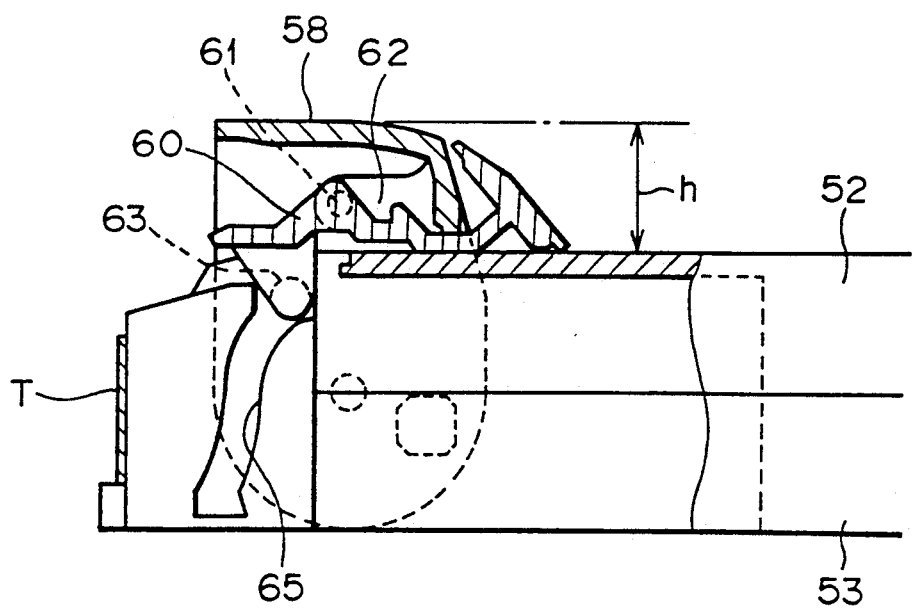

Specifically, when the reel holders 8, 9 are unlocked, they are angularly moved rearwardly about the support shafts 10, 11 by a moving mechanism in the magnetic recording and reproducing device. The tape reels 4, 5 are also moved with the reel holders 8, 9 toward the rear corners of the cassette housing 1, thus enlarging the mouth 12 as shown in FIG. 8.

Then, a head drum 71 and various tape transport members 72 including an impedance roller 73, tape guides 74, 75, 76, loading posts 77, 78, a capstan 79, and a pinch roller 80 (FIG. 8) of the magnetic recording and reproducing device can be inserted fully into the enlarged mouth 12, so that signals can be recorded on and reproduced from the magnetic tape T by the head drum 71.

More specifically, the tape guides 74, 75, 76, the loading posts 77, 78, and the capstan 79 are mounted on a fixed chassis of the magnetic recording and reproducing device, and are positioned in the mouth 12 when the tape cassette is loaded in the magnetic recording and reproducing device. The head drum 71, the impedance roller 73, and the pinch roller 80 are mounted on a movable plate which is displaceable with respect to the fixed chassis of the magnetic recording and reproducing device. Before the tape cassette is loaded in the magnetic recording and reproducing device, the head drum 71, the impedance roller 73, and the pinch roller 80 are positioned outside of a region which will be occupied by the mouth 12 when the tape cassette is loaded. When the tape cassette is loaded in the magnetic recording and reproducing device, the movable plate is moved to insert the head drum 71, the impedance roller 73, and the pinch roller 80 from the front of the tape cassette into the mouth 12. The magnetic tape T stretched between the roller guides 6a, 6b is drawn by the head drum 71 into the mouth 12 where the magnetic tape T extends along a certain path. At the same time, the loading posts 77, 78 move arcuately around the head drum 71 to wind the magnetic tape T around the head drum 71, whereupon the loading of the magnetic tape T is completed.

The above tape loading operation is carried out while the front lid 28 is being opened by a lid-opening mechanism of the magnetic recording and reproducing device. Because all of the head drum 71 and the tape transport members 72 are accommodated completely within the mouth 12, the front lid 28 can be closed again after the magnetic tape T has been loaded around the head drum 71.

The back lid 32 leaves at its opposite ends the gaps a for passage of the magnetic tape T therethrough, as described above. Therefore, the back lid 32 does not physically interfere with the magnetic tape T placed in the gaps a, making it possible to close the front lid 28 smoothly and reliably.

Since the mouth 12 is considerably enlarged when the tape cassette is loaded in the dedicated magnetic recording and reproducing device, the head drum 71 and the tape transport members 72 are fully accommodated in the mouth 12 when the tape loading operation is completed. While signals are being recorded on or reproduced from the magnetic tape T in the tape cassette, the head drum 71 and the tape transport members 72 in the magnetic recording and reproducing device are positioned within a region which is of substantially the same size as the tape cassette. The dedicated magnetic recording and reproducing device may be of a miniature size corresponding to the size of the tape cassette, and hence may be rendered more compact than the conventional magnetic recording and reproducing devices.

Inasmuch as the front lid 28 can be closed after the tape loading operation is completed, the thickness of the magnetic recording and reproducing device may be reduced by a dimension which would remain added if it were impossible to close the front lid 28. Consequently, the magnetic recording and reproducing device may be made compact in size.

While the present invention has been described as being applied to an 8-mm video cassette, the principles of the present invention are also applicable to other tape cassettes for recording and reproducing information using rotary heads, such as the ½-inch video cassettes that are currently in use, and a tape cassette for use in a DAT (digital audio tape recorder).

Thus, there is provided in accordance with the invention a novel and highly effective tape cassette having a mouth capable of accommodating a head drum therein and a lid that can be opened to admit the head drum and then closed, the head drum then being contained within the mouth and a magnetic tape being wound around the head drum, so that signals can be recorded on or reproduced from the tape while the lid is closed. Many modifications of the preferred embodiment of the invention disclosed above will readily occur to those skilled in the art upon consideration of this disclosure. For example, the position or positions at which the gap or gaps are provided may be varied. Specifically, a single gap can be provided in the middle of the back lid, or the tape may be trained away from the lid altogether during recording and reproducing of signals on or from the magnetic tape. Accordingly, the invention is not limited except by the appended claims.

I claim:

1. A tape cassette comprising:
   housing means;
   a pair of reels;
   means mounting said reels for rotation in said housing means;
   a recording medium wound on said reels and extending therebetween for transport from one of said reels to the other;
   said housing means being formed with an opening through which transducer means can gain access to said recording medium for recording and reproducing signals on and from said recording medium;
   lid means connected to said housing means and movable between a first position wherein said lid means blocks said opening and a second position wherein said lid means is displaced from said opening and from said recording medium; wherein
   said lid means is in said first position and said recording medium is enclosed within said housing means for protection when said tape cassette is not in use;
   said lid means is in said second position during introduction of transducer means into and withdrawal of transducer means from said housing means; and
   at least one gap-defining means is provided for accommodating passage of said recording medium so that the transducer means is enclosed within said housing means, said lid means is in said first position, and said recording medium is in operative association with said transducer means during recording and reproducing of signals on and from said recording medium.

2. A tape cassette comprising:
   housing means;
   a pair of reels;
   means mounting said reels for rotation in said housing means;

a recording medium wound on said reels and extending therebetween for transport from one of said reels to the other;

said housing means being formed with an opening through which transducer means can gain access to said recording medium for recording and reproducing signals on and from said recording medium;

front and back lid means connected to said housing means and movable between a first position wherein said front and back lid means block said opening and form a channel capable of enclosing said recording medium at a front portion of said housing means and a second position wherein said front and back lid means are displaced from said opening and from said recording medium; wherein said front and back lid means are in said first position and said recording medium is enclosed within said channel for protection when said tape cassette is not in use;

said front and back means are in said second position during introduction of transducer means into and withdrawal of transducer means from said housing means; and at least one gap-defining means is provided for accommodating passage of said recording medium so that the transducer means is enclosed within said housing means, said front and back lid means are in said first position, and said recording medium is in operative association with said transducer means during recording and reproducing of signals on and from said recording medium.

3. A tape cassette comprising:

housing means;

a pair of reels;

means mounting said reels for rotation in said housing means;

a recording medium wound on said reels and extending therebetween for transport from one of said reels to the other;

said housing means being formed with an opening through which transducer means can gain access to said recording medium for recording and reproducing signals on or from said recording medium; and front and back lid means connected to said housing means and movable between a first position and a second position, wherein in said first position said front and back lid means block said opening and form a channel between said front and back lid means at a front portion of said housing means and in said second position said front and back lid means are displaced from said opening and from said recording medium and a transducer can be introduced into and withdrawn from said housing means;

said back lid means including at least one gap-defining means forming a gap being adapted for passage of said recording medium therethrough when said front and back lid means are in said first position, so that after said front and back lid means have been placed in said second position and which said transducer is introduced into said housing means, said recording medium can be passed through said gap to a position within said housing means and behind said back lid means for cooperation with said transducer and after said transducer is withdrawn from said housing with said front and back lid means in said second position, said front and back lid means are moved to said first position and said recording medium is enclosed within said channel for protection.

4. A tape cassette according to claim 3 wherein said back lid means is formed to leave a pair of gaps at opposite ends thereof, each of said gaps being adapted for passage of said recording medium therethrough when said front and back lid means are in said first position after introduction of said transducer into said housing while said front and back lid means are in said second position.

* * * * *

UNITED STATES PATENT AND TRADEMARK OFFICE
CERTIFICATE OF CORRECTION

PATENT NO. : 5,225,954
DATED : July 6, 1993
INVENTOR(S) : Yoshio Kondo

It is certified that error appears in the above-indentified patent and that said Letters Patent is hereby corrected as shown below:

Title page, item [56], under References Cited, line 5, change "Yakoo" to --Yokoo--.

Column 6, line 2, change "a" to --an--.

Signed and Sealed this

Twenty-fourth Day of January, 1995

BRUCE LEHMAN

Attest:

Attesting Officer

Commissioner of Patents and Trademarks